United States Patent [19]

Bennett

[11] Patent Number: 5,742,670

[45] Date of Patent: Apr. 21, 1998

[54] PASSIVE TELEPHONE MONITOR TO CONTROL COLLABORATIVE SYSTEMS

[75] Inventor: Richard Lynn Bennett, Holmdel, N.J.

[73] Assignee: NCR Corporation, Dayton, Ohio

[21] Appl. No.: 370,514

[22] Filed: Jan. 9, 1995

[51] Int. Cl.⁶ .................. H04M 3/42; H04J 1/00
[52] U.S. Cl. .......... 379/142; 379/245; 379/207; 379/95; 370/401; 370/411; 395/200.02; 395/200.08; 395/200.16
[58] Field of Search .................. 379/93, 95, 201, 379/142, 34, 207, 245, 246; 370/60, 60.1, 62, 68.1, 94.1, 94.2, 85.13, 85.14, 400–402, 411, 422, 428, 429, 901; 395/200.08, 200.16, 200.2, 200.09, 200.04, 200.03, 200.15, 680, 682, 685; 348/7, 12–15; 455/5.1

[56] References Cited

U.S. PATENT DOCUMENTS

| | | | |
|---|---|---|---|
| 5,117,452 | 5/1992 | Callele et al. | 379/93 |
| 5,208,912 | 5/1993 | Nakayama et al. | 395/200 |
| 5,280,481 | 1/1994 | Chang et al. | 370/85.14 |
| 5,303,042 | 4/1994 | Lewis et al. | 348/14 |
| 5,374,952 | 12/1994 | Flohr | 348/12 |
| 5,406,557 | 4/1995 | Baudoin | 370/61 |
| 5,469,500 | 11/1995 | Satter et al. | 379/201 |
| 5,473,679 | 12/1995 | La Porta et al. | 348/14 |
| 5,491,743 | 2/1996 | Shiio et al. | 348/14 |
| 5,512,935 | 4/1996 | Majeti et al. | 455/5.1 |
| 5,521,914 | 5/1996 | Mavraganis et al. | 370/85.13 |
| 5,528,595 | 6/1996 | Walsh et al. | 370/85.13 |
| 5,544,163 | 8/1996 | Madonna | 370/85.14 |

*Primary Examiner*—Curtis Kuntz
*Assistant Examiner*—Paul Lamis
*Attorney, Agent, or Firm*—George H. Gates

[57] ABSTRACT

A method and apparatus for using a passive telephone monitor to control collaborative systems comprising one or more local computers connected to one or more remote computers, wherein an image displayed on the local computer is substantially simultaneously displayed on the remote computer.

19 Claims, 4 Drawing Sheets

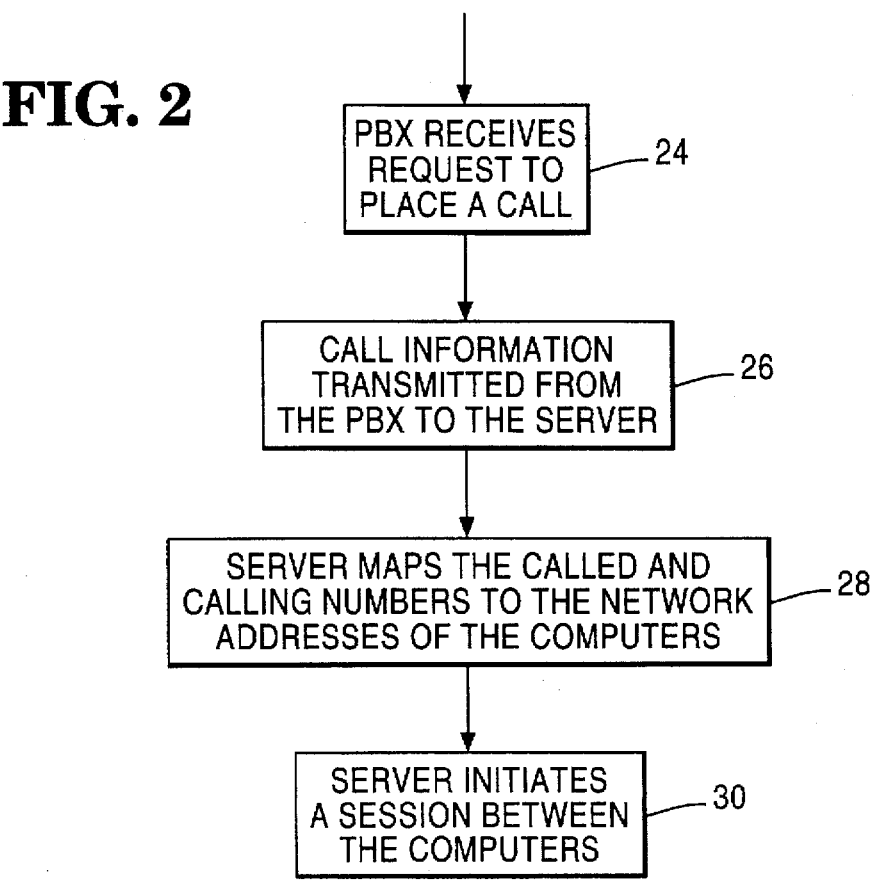

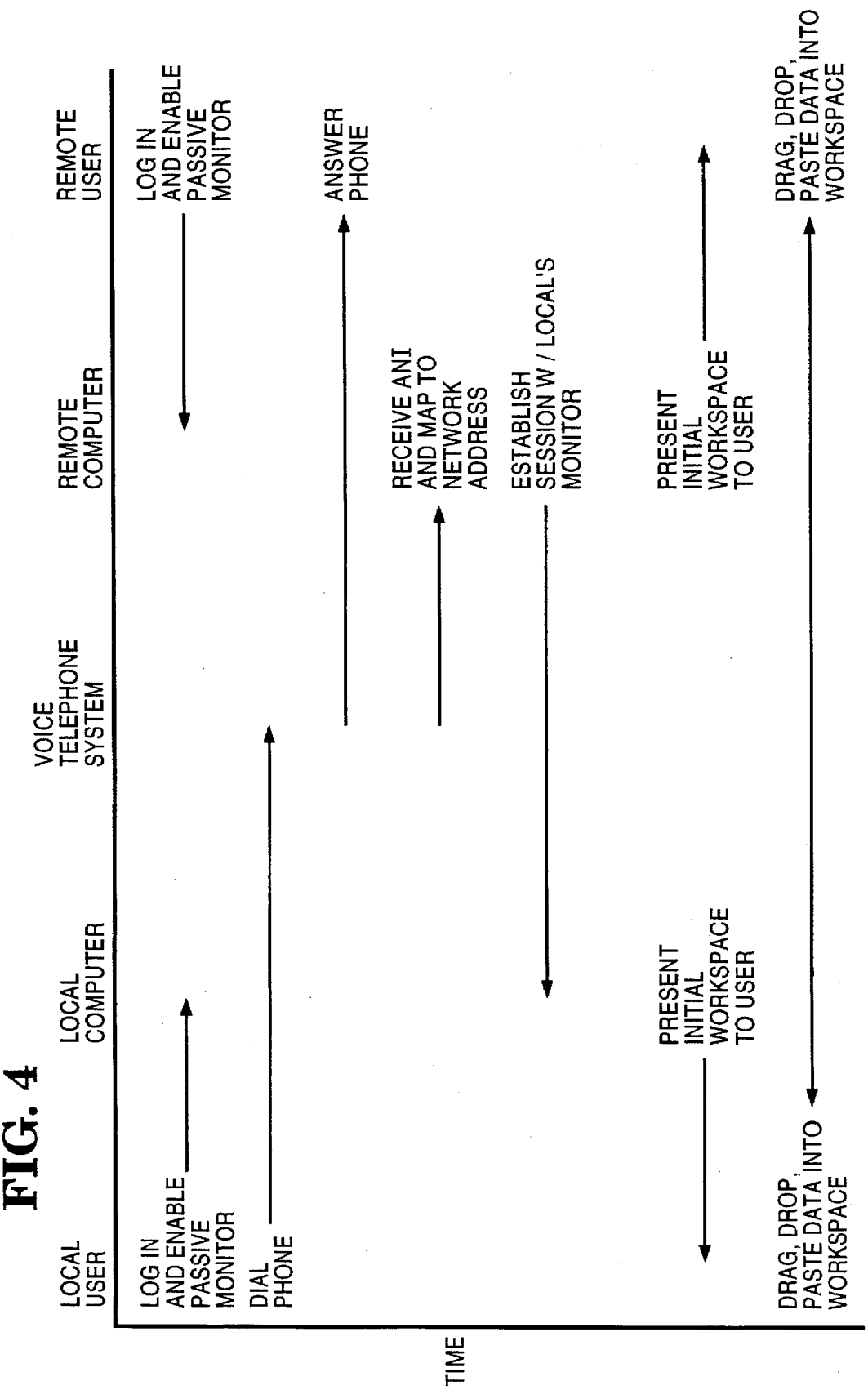

PASSIVE TELEPHONE MONITOR TO CONTROL COLLABORATIVE SYSTEMS

BACKGROUND OF THE INVENTION

1. Field of the Invention

The present invention generally relates to computer and telephony integration, and in particular, to a method and apparatus for using a passive telephone monitor to control collaborative systems.

2. Description of Related Art

There is often a need to access computer programs during telephone conversations. Such telephone conversations may require the user to record the call in a telephone log, modify a database, or otherwise manipulate information in a computer.

Increasingly, there is a need for both the called and calling party to share a workspace in a computer network during the telephone call, in order to review or update shared information. However, while the mechanics for placing phone calls are simple and well known, the same cannot be said for the mechanics of setting up a shared workspace in a computer network. Thus, there is a need in the art for sharing workspaces between two or more computers in a computer network in a manner that is controlled by telephone usage.

SUMMARY OF THE INVENTION

To overcome the limitations in the prior art described above, and to overcome other limitations that will become apparent upon reading and understanding the present specification, the present invention discloses a method and apparatus for using a passive telephone monitor to control collaborative systems comprising one or more local computers connected to one or more remote computers, wherein an image displayed on the local computer is substantially simultaneously displayed on the remote computer.

It is an object of the invention to provide an improved system for managing shared workspaces in a collaborative system. It is a further object of the invention to provide a system for automatically communicating between users on remotely located computers when the users are also connected by telephone. It is a further object of the invention to provide a system for recognizing when a phone call is placed between users and then communicating between the users' remotely located computer so that both can access a shared workspace on a computer network.

BRIEF DESCRIPTION OF THE DRAWINGS

Referring now to the drawings in which like reference numbers represent corresponding parts throughout:

FIG. 2 is a flowchart diagram illustrating one possible method for controlling the display of information;

FIG. 3 is a block diagram illustrating an exemplary table associating telephone numbers with network addresses according to the present invention;

FIG. 4 is a timing diagram that illustrates an exemplary call setup for the passive telephone monitor according to the present invention.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides one concept for computer/telephone integration that unites personal computers and telephones for business purposes. The present invention allows two or more network users to share an application that has been established in response to the placing of a telephone call which operates in parallel with the sharing of the application. The present invention allows a user to establish computer sessions with the same level of transparency as the telephone itself. For example, when a person picks up the phone to place a call, that person does not think about the mechanics of establishing an electrical connection via the telephone. The present invention accomplishes the same thing in establishing shared workspaces between users, and thereby minimize the effort involved in establishing such workspaces. Thus, the present invention is a very transparent communication device for sharing data on a computer network in parallel with a telephone conversation. It is preferred that the shared data be multimedia data and that the user be able to watch changes being made to that shared workspace by the other user in realtime.

Figure 1:
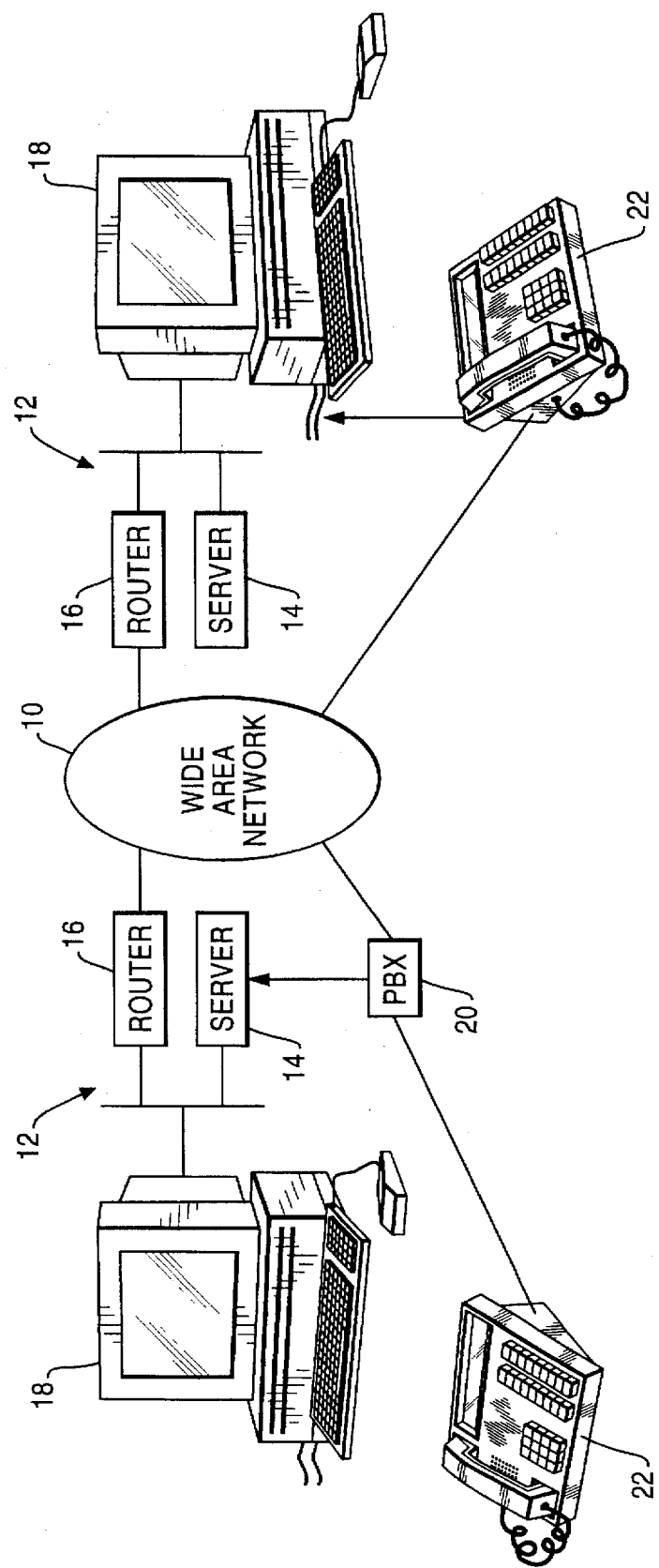
FIG. 1 is a block diagram illustrating one possible embodiment of the hardware comprising the present invention.

FIG. 1 is a block diagram illustrating one possible embodiment of the hardware comprising the present invention. The present invention is typically incorporated into a wide area computer network 10. The wide area network 10 includes one or more local area networks 12 comprised of servers 14, wherein the local area networks 12 are coupled into the wide area network 10 via routers 16 in a manner well known in the art. The local area networks 12 are comprised of one or more personal computers 18 coupled to their respective local servers 14. The environment of the present invention also includes a voice telephone system comprising at least one switch or PBX 20 controlling the operations of telephones 22 belonging to users of the wide area network 10. In the preferred embodiment, there exists at least one physical link between the PBX 20 and at least one of the servers 14 in the wide area network 10. Also in the preferred embodiment, the server 14 passively monitors the link with the PBX 20. The word "passive" implies that the PBX (on behalf of the phone user) is in control of the session setup and that the computer network passively follows the PBX based on the information it monitors from the PBX. However, those skilled in the art will recognize that the server 14 could actively control the link with the PBX 20 instead. An active computer network would, based on user selection of a certain person in an address book application executed thereon, direct the PBX to establish a phone session.

FIG. 2 is a flowchart illustrating one possible embodiment of the steps performed by the present invention. Block 24 represents the PBX 20 receiving a request to place a call between at least two of the telephones 22 coupled thereto, which request initiates actuation of the present invention. Block 26 represents information about the call being transmitted from the PBX 20 to the server 14. Preferably, the information received by the server 14 from the PBX 20 would comprise automatic number identification (ANI) or similar type information that identifies both the called and calling numbers. Block 28 represents the server 14 mapping the called and calling numbers to the network addresses of the associated personal computers 18. FIG. 3 is a block diagram illustrating an exemplary table associating PBX 20 extension numbers 32 for the telephones 22 with Ethernet™ or internet or other network addresses 34 for the personal computers 18, so that a user would be identified by both values. Referring again to FIG. 2, block 30 represents the server 14 initiating a session between the personal computers 18 on the wide area network 10 identified by the called and calling number, so that the associated computers 18 access a shared workspace across the wide area network 10.

FIG. 4 is a timing diagram that illustrates an exemplary call setup for the passive telephone monitor according to the present invention. Initially, the local and remote users login into their respective local and remote computers and enable their respective passive telephone monitors. The local user then places a telephone call through the voice telephone system to the remote user, who answers the telephone call. At the same time, the remote computer receives the ANI information from the voice telephone system, and maps the ANI information to a network address. Then, the remote computer establishes a session across the computer network to the local computer's passive telephone monitor (or vice versa). Both the local and remote computers present an initial shared workspace to their respective users using the displays attached to their respective computers. Thereafter, the local and remote users can share information by dragging, dropping or pasting information into windows displayed on their respective local and remote computers that represents the shared workspace.

Figure 5:
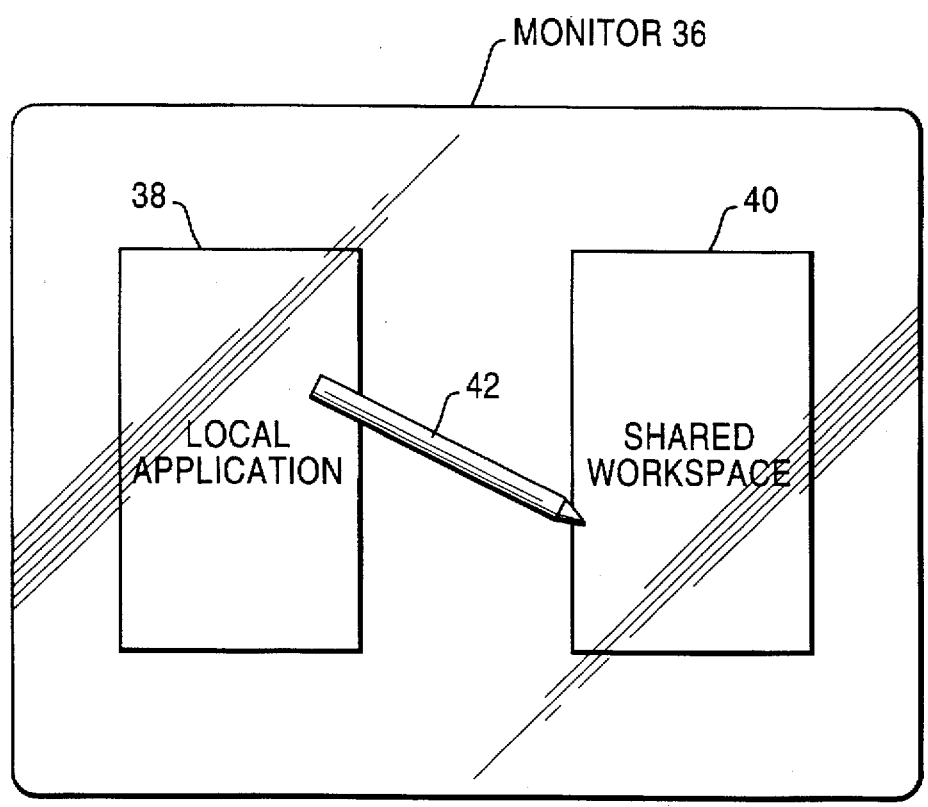
FIG. 5 is a block diagram that illustrates how information is between the local and remote computers.

FIG. 5 is a block diagram that illustrates how information is between the local and remote computers 18. A monitor 36 displays one or more windows 38 and 40 under the control of a windowing graphical user interface, such as Microsoft Windows 3.1. A first window 38 may display information from a completely local application, such as spreadsheet. A second window 40 may display information from the shared workspace with the remote computer 18. The arrow 42 between the first window 38 and second window 40 represents the local user sharing information from the local application in the first window 38 with the remote user by dragging, dropping or pasting the information into the second window 40 displaying information from the shared workspace with the remote computer 18. The same steps can be performed by the remote user as well.

In the present invention, each of the computers 18 forms part of a collaborative system, wherein the calling party's computer 18 interacts with one or more called party's computer 18. The collaborative system simultaneously replicates selected windows displayed on the calling party's computer 18 at one or more called party's computer 10. This replication allows the users to share workspace areas on the wide area network 10. Note that it is possible for both the called party's computer 18 and the calling party's computer 18 to run a plurality of other applications at the same time because of the multi-tasking capabilities of the operating environment.

The present invention relies on the Telephony Services Application Programming interface (TSAPI) developed by Novell, Inc. and AT&T Corporation, the assignee of the present invention. The TSAPI focuses on call control to enable computers 18 (including servers 14) to control dialing, answering, transferring and conferencing of telephone calls. In addition, the TSAPI can control PBXs 20, switches and digital phones 22. With TSAPI, the connection from the phone 22 to the file server 14 or personal computer 18 is logical, not physical. When the user logs in, the server 14 creates a mapping between the user's personal computer 18 address and phone 22 address. That association synchronizes the flow of data on the wide area network 10 with the flow of telephone calls on the PBX 20.

CONCLUSION

This concludes the description of the preferred embodiment of the invention. In summary, the present invention discloses a method and apparatus for using a passive telephone monitor to control collaborative systems comprising one or more local computers connected to one or more remote computers, wherein an image displayed on the local computer is substantially simultaneously displayed on the remote computer.

The following paragraph describes some alternative ways of accomplishing the present invention. Those skilled in the art will recognize that the present invention could be used any type of computer, and need not be limited to a personal computer. Those skilled in the art will recognize that different networks and operating systems could be used with the present invention described herein. Those skilled in the art will recognize that various forms of communication links between computers could be used with the present invention. Those skilled in the art will recognize that the present invention could be used any type of display interface. Those skilled in the art will recognize that alternate approaches to capturing or intercepting telephony events could be substituted for the approach described herein. Those skilled in the art will recognize that the present invention need not be limited to configurations where a PBX is involved and as long as an interface exist between the voice telephone network that can provide calling/called number information to a server, then the same effect can be achieved. Those skilled in the art will recognize that the present invention could be used with more than two parties and that conference calls and work spaces shared between any number of parties could be achieved using the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a collaborative system comprising one or more computers connected together in a network and a voice telephone system, wherein at least one of the computers is connected to a voice telephone system, a method of managing shared workspaces, comprising the steps of:

recognizing when a voice call is made from a calling party to a called party through the voice telephone system;

communicating identification information for the voice call from the voice telephone system to the computer connected to the voice telephone system, wherein the identification information identifies the calling and called parties of the voice call; and establishing a shared workspace on the network separate from but in parallel with the voice call between the calling party's computer and the called party's computer.

2. The method of claim 1, wherein the identification information comprises automatic number identification (ANI) identifying the calling and called parties of the voice call.

3. The method of claim 1, further comprising the step of mapping phone numbers associated with the voice call between the calling and called parties to corresponding network addresses of the calling party's and called party's computers.

4. The method of claim 3, wherein the mapping step comprises the step of accessing a table on the connected computer associating network addresses for the calling party's and called party's computers with the phone numbers for the calling and called parties of the voice call.

5. The method of claim 1, further comprising the step of replicating selected information displayed on the calling party's computer at the called party's computer.

6. The method of claim 1, further comprising the step of replicating selected information displayed on the called party's computer at the calling party's computer.

7. A collaborative system for managing shared workspaces, comprising:

(a) a plurality of computers connected together in a network, wherein at least one of the computers is connected to a voice telephone system;

(b) means, performed by the computer connected to the voice telephone system, for recognizing when a voice call is made from a calling party identified by a calling number to a called party identified by a called number through the voice telephone system;

(c) means, performed by the computer connected to the voice telephone system, for communicating identification information for the voice call from the voice telephone system to the computer connected to the voice telephone system, wherein the identification information identifies the calling and called numbers of the voice call; and (d) means, performed by the computer connected to the voice telephone system, for establishing a shared workspace on the network separate from but in parallel with the voice call between the calling party's computer and the called party's computer.

8. The system of claim 7, wherein the identification information comprises automatic number identification (ANI) identifying the calling and called numbers of the voice call.

9. The system of claim 7, wherein one of the computers further comprises means for mapping the calling and called numbers of the voice call to corresponding network addresses of the calling party's and called party's computers.

10. The system of claim 9, wherein the means for mapping comprises means for accessing a table on one of the computers associating network addresses for the calling party's and called party's computers with the calling and called numbers.

11. The system of claim 7, wherein the means for establishing further comprises means for initiating a session between the calling party's and called party's computers on the network associated with the calling and called numbers of the voice call, so that the calling party's and called party's computers access the shared workspace across the network.

12. The system of claim 7, further comprising means for replicating selected information displayed on the calling party's computer at the called party's computer.

13. The system of claim 7, further comprising means for replicating selected information displayed on the called party's computer at the calling party's computer.

14. A program storage device readable by a computer, tangibly embodying a program of instructions executable by the computer to perform method steps for managing shared workspaces, the method comprising the steps of:

recognizing when a voice call is made from a calling party to a called party through a voice telephone system;

communicating identification information for the voice call from the voice telephone system to a computer connected to a voice telephone system, wherein the identification information identifies the calling and called parties of the voice call; and establishing a shared workspace on a network separate from but in parallel with the voice call between the calling party's computer and the called party's computer.

15. The program storage device of claim 14, wherein the identification information comprises automatic number identification (ANI) identifying the calling and called parties.

16. The program storage device of claim 14, wherein the method further comprises the step of mapping phone numbers associated with the calling and called parties to corresponding network addresses of the calling party's and called party's computers.

17. The program storage device of claim 16, wherein the mapping step comprises the step of accessing a table on the connected computer associating network addresses for the calling party's and called party's computers with extension numbers for the calling and called parties.

18. The program storage device of claim 14, wherein the method further comprises the step of replicating selected information displayed on the calling party's computer at the called party's computer.

19. The program storage device of claim 14, wherein the method further comprises the step of replicating selected information displayed on the called party's computer at the calling party's computer.

* * * * *